(12) United States Patent
Stapp

(10) Patent No.: US 6,649,071 B2
(45) Date of Patent: Nov. 18, 2003

(54) WATER TREATMENT METHOD FOR REDUCING LEVELS OF CR+6

(75) Inventor: William E. Stapp, Oakland, CA (US)

(73) Assignee: A. S. Incorporated, Santa Rosa, CA (US)

(*) Notice: Subject to any disclaimer, the term of this patent is extended or adjusted under 35 U.S.C. 154(b) by 0 days.

(21) Appl. No.: 10/057,242

(22) Filed: Jan. 25, 2002

(65) Prior Publication Data

US 2002/0195405 A1 Dec. 26, 2002

Related U.S. Application Data

(60) Provisional application No. 60/264,455, filed on Jan. 26, 2001, and provisional application No. 60/316,427, filed on Aug. 30, 2001.

(51) Int. Cl.⁷ .................................................. C02F 1/70
(52) U.S. Cl. ........................................ 210/757; 210/913
(58) Field of Search .................................. 210/757, 758, 210/913

(56) References Cited

U.S. PATENT DOCUMENTS 3,616,344 A * 10/1971 Peterson et al.
5,415,848 A * 5/1995 Thornton
5,769,938 A * 6/1998 Ueshima et al.

* cited by examiner

*Primary Examiner*—Betsey Morrison Hoey
(74) *Attorney, Agent, or Firm*—Jacqueline F. Mahoney; Peter J. Dehlinger; Perkins Coie LLP

(57) ABSTRACT

A treatment effective for removing or substantially reducing the amount of $Cr^{+6}$ present in drinking water or wastewater is described. The method includes adding a stannous salt of a non-carbon acid, in an amount effective to reduce most or substantially all of the chromic ion in the water.

15 Claims, 2 Drawing Sheets

$$2Cr^{+6} + 3Sn^{+2} \longrightarrow 2Cr^{+3} + 3Sn^{+4}$$

WATER TREATMENT METHOD FOR REDUCING LEVELS OF CR+6

This application claims the benefit of priority to U.S. Provisional Application No. 60/316,427 filed Aug. 30, 2001 and also claims the benefit of priority to U.S. Provisional Application No. 60/264,455, filed Jan. 26, 2001, both of which are incorporated herein by reference in their entirety.

FIELD OF THE INVENTION

The present invention relates to methods for reducing the levels of oxidized chromium ion, particularly $Cr^{+6}$, in drinking or wastewater.

BACKGROUND OF THE INVENTION

Currently, the United States Environmental Protection Agency (USEPA) allows up to 100 parts per billion (ppb) total chromium (including chromium in any of its predominant oxidative states, including $Cr^{+2}$, $Cr^{+3}$, $Cr^{+4}$, $Cr^{+5}$ and $Cr^{+6}$) in drinking water. Many states have considerably lower allowances; for example, the state standard in California is 50 ppb total chromium. The USEPA currently allows up to 2.77 parts per million (ppm) daily and 1.30 ppm as a monthly average chromium ion in discharge wastewater. A growing concern about the carcinogenicity of $Cr^{+6}$ is prompting some states to consider dramatically reducing the amount of $Cr^{+6}$ allowed in drinking and wastewater. California, for example, recently signed into law a requirement for the Department of Health Services to adopt a $Cr^{+6}$ MCL by Jan. 1, 2004. A standard of less than 1 ppb $Cr^{+6}$ in drinking water has been considered in some states. Additionally, the USEPA is considering lowering the allowable chromium ion in discharge by approximately 50%.

Since many water sources, such as reservoir and well sources, contain levels of $Cr^{+6}$ considerably above these levels, the proposed new standards would force many water treatment facilities to further treat water to remove $Cr^{+6}$ levels. The USEPA has currently approved Coagulation/Filtration, Ion Exchange, Reverse Osmosis, and Lime Softening treatment methods for removing chromium from drinking water.

SUMMARY OF THE INVENTION

Accordingly, it is an object of the invention to provide a simple, inexpensive method for treating water to substantially remove or greatly reduce the amount of an undesirable chromium ion, such as $Cr^{+6}$, present in drinking water.

It is another object of the invention to provide a treatment technology, which enables effluent to be polished or further treated to substantially remove or greatly reduce the amount of an undesirable chromium ion, such as $Cr^{+6}$, present in the effluent.

In one aspect, the invention includes a method for removing or substantially reducing the amount of oxidized chromium ion present in water supplied from the plant as drinking water. Specifically, the method is useful for treating water in conjunction with a water treatment method that includes the steps of obtaining water at a wellhead, transporting the water to a water-treatment plant, and treating the water at the plant with an oxidant. In the method, prior to exposing the water to the oxidant, an amount of a stannous salt of an inorganic acid or an organic acid effective to reduce a substantial portion of any $Cr^{+6}$ present to a lower oxidation state is added.

In one embodiment, the amount of a stannous salt of an inorganic acid or an organic acid is added that is effective to reduce any $Cr^{+6}$ present to a lower oxidation state such that the final $Cr^{+6}$ concentration is less than or equal to 100 ppb. In another embodiment, the final $Cr^{+6}$ concentration is less than or equal to 50 ppb. In yet another embodiment, the final $Cr^{+6}$ concentration is less than or equal to 1 ppb.

In one embodiment, the step of adding includes (i) determining the level of $Cr^{+6}$ in the water obtained from the wellhead, and (ii) adding an excess stoichiometric amount of $Sn^{+2}$ to the water, where the stoichiometric amount is defined as $3Sn^{+2}$ to $2Cr^{+6}$.

In another embodiment, the excess stoichiometric added is about a 1.1–10 fold excess amount of $Sn^{+2}$.

The stannous salt is added in an amount of between about 50–200 parts $Sn^{+2}$ per billion on a weight basis, in another embodiment. The stannous salt is, in one embodiment, $SnCl_2$. The stannous salt can be added, for example, in an acidified aqueous slurry or solution of stannous salt.

The stannous salt is added, in another embodiment, as an acidified composition consisting essentially of $SnCl_2$, water and HCl.

In one embodiment, the lower oxidation state of $Cr^{+6}$ is $Cr^{+3}$.

It will be appreciated that in another embodiment, the water can be obtained at a wellhead and transported directly to a residence.

In another aspect, the invention includes a method of treating wastewater by removing or substantially reducing the amount of oxidized chromium ion by treating the water with an oxidant; and adding to water, after to exposing the water to the oxidant, an amount of a stannous salt of an inorganic acid effective to reduce a substantial portion of any $Cr^{+6}$ present to a lower oxidation state.

In one embodiment, the step of adding includes (i) determining the level of $Cr^{+6}$ in the water, and (ii) adding an excess stoichiometric amount of $Sn^{+2}$ to the water, where the stoichiometric amount is defined as $3Sn^{+2}$ to $2Cr^{+6}$.

The excess stoichiometric amount is, in one embodiment, a 1.1–10 fold excess amount of $Sn^{+2}$.

In another embodiment, the stannous salt is added in an amount of between about 50–200 parts $Sn^{+2}$ per billion on a weight basis. The stannous salt is, in one embodiment, $SnCl_2$.

The stannous salt is added, in another embodiment, as an acidified composition consisting essentially of $SnCl_2$, water and HCl.

The method further includes, in another embodiment, filtrating the water after addition of the stannous salt.

In one embodiment, the lower oxidation state of $Cr^{+6}$ is $Cr^{+3}$.

The present invention is designed for use in a water treatment method for treating wastewater or drinking water that includes the steps of adding to the water an amount of a stannous salt of an inorganic acid or organic acid effective to reduce a substantial portion of any $Cr^{+6}$ present in the water to lower oxidation states of chromium, as represented by $Cr^{+3}$.

These and other objects and features of the invention will become more fully apparent when the following detailed description of the invention is read in conjunction with the accompanying drawings.

DETAILED DESCRIPTION OF THE INVENTION

I. Definitions

Figures 1, 2:
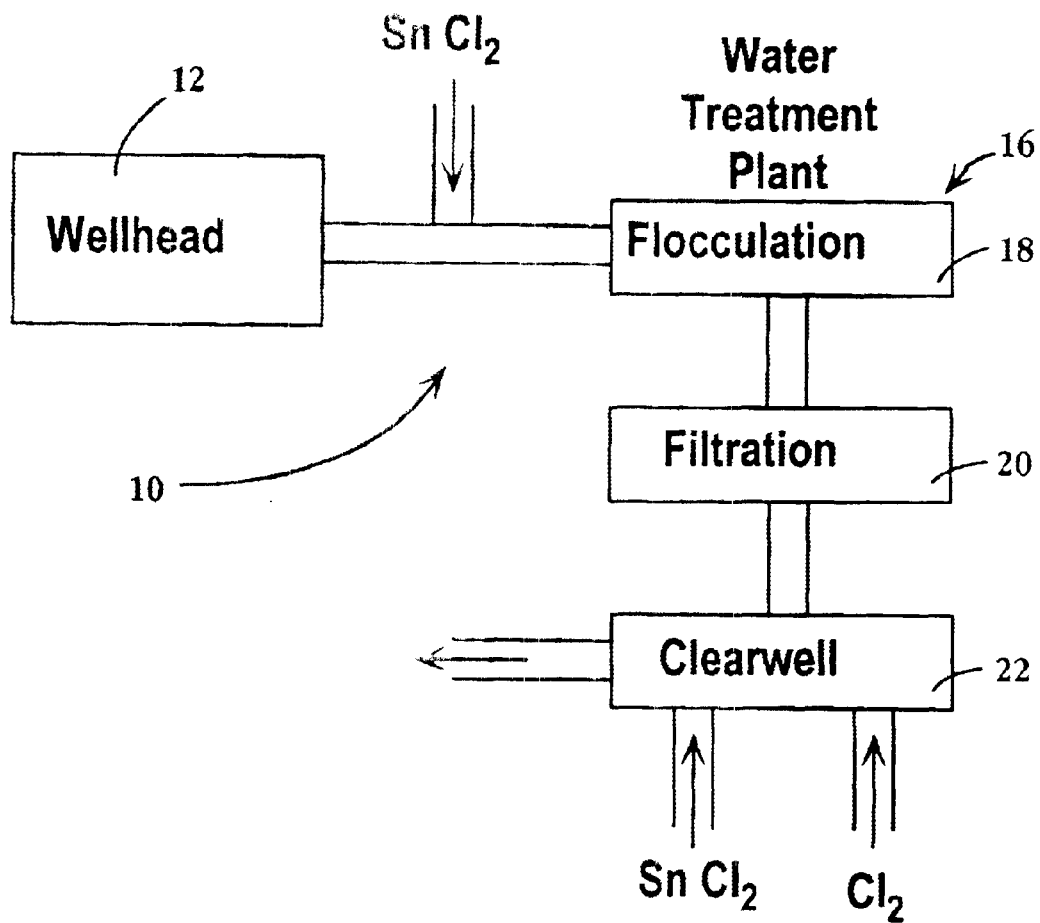
FIG. 1 shows certain water-treatment system components for producing drinking water in accordance with the invention.
FIG. 2 is the redox equation for the metal ions that participate in the method of the invention.

A "non-carbon" or "inorganic" acid is an acid containing no carbon atoms, e.g. hydrochloric, sulfuric, hydrobromic, hydrofluoric, phosphoric, or nitric acid.

A "stannous salt of an inorganic acid" refers to a compound that results from replacement of part or all of the acid hydrogen of an acid by a stannous ion.

"Effluent" or "wastewater" refers to fluid waste material from industrial refuse discharged into the environment, especially when serving as a pollutant or water that has been used in a industrial or manufacturing process.

As used herein, an "aqueous or paste solution" of a stannous salt of an inorganic acid refers to a composition of the salt in water, preferably in fairly high concentration, i.e., about 30 weight percent or greater, but may be as dilute as about 5%, if the salt is of sufficient solubility in water to achieve this concentration. The composition may include an acid, e.g. HCl, $H_2SO_4$, or $HNO_3$, to promote dissolution of the stannous salt. There are no other components in any appreciable concentration. The resulting paste solution is similar to water in viscosity.

"Substantially reduce" or "reduce a substantial portion" refers to an amount of the stannous salt of an inorganic acid effective to reduce the amount of oxidized chromium ion present in the water to less than or equal to a federally or state set allowance.

"Parts per million" or "ppm" and "parts per billion" or "ppb" refers to parts by weight in water. Thus, 5 ppb stannous ion refers to 5 parts by weight of stannous per 1 billion parts by weight of water.

"Maximum Contaminant Level Goal" or "MCLG" refers to a non-enforceable contaminant level based solely on possible health risks and exposure.

"Maximum Contaminant Level" or "MCL" refers to the enforceable standard set by the USEPA. The MCL is set as close to the MCLG as possible considering the ability of public water systems to detect and remove contaminants using suitable treatment technologies.

"USEPA" or "EPA" refers to the United States Environmental Protection Agency.

An "amount of stannous salt which corresponds to a concentration of stannous ion" in a given concentration range is determined from the relative molecular weights of the components. The amount of stannous that converts to $SnSO_4$, $SnCl_2$ and $SnBr_2$ is shown in Table 1.

TABLE 1

| Amount of stannous (ppm) | Amount of $SnSO_4$ (ppm) | Amount of $SnCl_2$ (ppm) | Amount of $SnBr_2$ (ppm) |
|---|---|---|---|
| 0.010 | 0.018 | 0.016 | 0.023 |
| 0.150 | 0.27 | 0.24 | 0.35 |
| 1.0 | 1.81 | 1.60 | 2.34 |
| 10 | 18.1 | 16.0 | 23.4 |
| 75 | 136 | 120 | 176 |

In the appended claims, water contained in a distributive water system to which a corrosion inhibitor is added is referred to as the "water system", rather than simply "water", to avoid confusion with the concentrated aqueous stannous halide solutions.

II. Chromium

A. Uses of Chromium

Chromium is an element with predominant oxidative states that include $Cr^{+2}$, $Cr^{+3}$, $Cr^{+4}$, $Cr^{+5}$ and $Cr^{+6}$. Hexavalent chromium is a powerful indiscriminate oxidizing agent that is, in most cases, soluble in water. Chromium is widely used in industrial processes such as steel manufacture and as a corrosion inhibitor. In fact, it is the principal alloying element in stainless steels, after iron. It is further used in magnetic tapes; and pigments for paints, cement, paper, rubber, composition floor covering and other materials. In its soluble form, chromium may be used in wood preservatives.

B. Health Effects

While trivalent chromium ($Cr^{+3}$) is an essential trace mineral, hexavalent chromium ($Cr^{+6}$) is classified as a carcinogen by the USEPA. The short-term health effects of exposure to hexavalent chromium at levels above the MCL potentially include skin irritation and ulceration. Long-term or lifetime exposure at levels above the MCL has the potential to cause damage to the liver, kidney, circulatory and nerve tissue as well as skin irritation and severe gastrointestinal system disturbance.

C. Environmental Release

The two largest sources of chromium emission in the atmosphere are from the chemical manufacturing industry and combustion of natural gas, oil and coal.

According to the Toxics Release Inventory, chromium compound releases to land and water from 1987 to 1993 totaled nearly 200 million pounds (90,718,474 kg). Table 2 shows the chromium release to land and water from 1987 to 1993 by state, for the top ten states.

TABLE 2

| State | Release to Water in lbs. (kg) | Release to Land in lbs. (kg) |
|---|---|---|
| Texas | 102,079 (46,302) | 64,301,920 (29,166,860) |
| North Carolina | 43,522 (19,741) | 55,217,044 (25,046,030) |
| Indiana | 85,570 (38,814) | 15,955,895 (7,237,472) |
| Ohio | 51,830 (23,510) | 8,319,600 (3,773,707) |
| Utah | 1,750 (794) | 5,817,015 (2,638,553) |
| Arizona | 2,300 (1,043) | 3,532,000 (1,602,088) |
| Kentucky | 255 (116) | 2,491,519 (1,130,134) |
| Pennsylvania | 110,149 (49,963) | 2,337,905 (1,060,456) |
| Georgia | 679,721 (30,8316) | 1,404,698 (637,160) |
| Indiana | 91,750 (41,617) | 1,404,870 (637,238) |
| Total | 2,876,055 (1,304,557) | 196,880,624 (89,303,549) |

Table 3 shows release of chromium to land and water from 1987 to 1993 by the major industries.

TABLE 3

| Industry | Release to Water in lbs. (kg) | Release to Land in lbs. (kg) |
|---|---|---|
| Industrial Organics | 3,272 (1,484) | 120,707,814 (54,752,143) |
| Steelworks, Blast furn. | 609,174 (276,317) | 16,638,880 (7,547,269) |
| Electrometallurgy | 33,269 (15,091) | 10,796,928 (4,897,404) |
| Copper smelting and refining | 1,750 (794) | 5,817,015 (2,638,554) |
| Nonferrous smelting | 2,300 (1,043) | 3,532,000 (1,602088) |
| Inorganic pigments | 88,721 (40,243) | 1,375,700 (624,007) |
| Pulp mills | 985,800 (447,151) | 224,198 (101,695) |

In 2001, the California Department of Health Services (DHS) adopted a regulation adding $Cr^{+6}$ to the list of unregulated chemicals requiring monitoring. Using a detection limit for purposes of reporting (DLR) of 1 μg/L, data was submitted for samples with a level at or above the DLR. The DLR is the level at which the DHS is confident about values reported by commercial laboratories using standard methods. Starting on Jan. 2, 2001, sampling of 2,410 sources including 2,220 wells, 186 surface water sources, and 4 mixed water sources showed a level of $Cr^{+6}$ at or greater than 1 μg/L in 59% of the sources. The percentage of sources by chromium+6 can be found concentration can be found in Table 4.

TABLE 4

| Concentration of Chromium$^{+6}$ (μg/L) | Percentage of Sources |
|---|---|
| ND or <1 | 41% |
| 1–5 | 38% |
| 6–10 | 13% |
| 11–20 | 6.1% |
| 21–30 | 1.4% |
| 31–40 | 0.4% |
| 41–50 | 0.1% |
| >50 | 0.2% |

III. Methods of the Invention

FIG. 1 shows elements of a water-treatment system 10 that employs the method of the invention. The system includes a source of the water, known as a wellhead and indicated at 12, and is typically a reservoir or well source. For a variety of reasons, e.g., contamination of underground water or effluent runoff into a reservoir supply, or because of natural mineral content, the water may contain levels of chromic ion, $Cr^{+6}$, that are above accepted levels, e.g., 1–100 ppb.

In one embodiment of the present invention, the water from the wellhead is piped to a treatment plant 16 including stations 18, 20, 22 for flocculating the well water, filtering the flocculated water, and adding an oxidant to the filtered water, respectively.

In accordance with an embodiment of the present invention, a stannous salt of an inorganic acid, such as stannous chloride ($SnCl_2$), is added to the water preferably at the wellhead, but in any case, prior to addition of oxidant to the water at station 22, and preferably prior to flocculation at station 16, such as shown at 14 where ($SnCl_2$) is added to water at the wellhead or before it reaches the water-treatment plant. Following this treatment, the water is carried to the treatment plant, where additional water treatment takes place. For example, the flocculation step at station 18 may be carried out with a flocculating agent that effects some reduction in $Cr^{+3}$ as well as other ions in the water.

At the clearwell station, the water is preferably chlorinated as a bacteriostatic agent. In addition, a stannous salt may be added to the water as indicated, as an anti-corrosive agent, in accordance, for example, with U.S. Pat. Nos. 6,001,156, 5,989,322, 5,510,057, and 5,202,058, all of which are incorporated herein by reference.

In accordance with a further embodiment of the invention, a stannous salt of an inorganic acid, such as stannous chloride ($SnCl_2$), is added to wastewater after addition of an oxidant and/or flocculation of the water at the water treatment station. The wastewater may further be filtered with any membrane or cartridge type filter known to be effective for filtering water.

The stannous salt is preferably added in an acidified salt composition, such as a composition containing about 0.1–70% by weight stannous salt, about 20–95% weight water and about 5–10% acid. An exemplary acidified salt composition is 50% by weight stannous chloride, 45% weight water and 5% HCl. The composition may be a solution composition, salt paste, or dried salt alone.

The amount of stannous salt is preferably added in stoichiometric excess of $Cr^{+6}$ in the water. The stoichiometry of the $Cr^{+6}$ reduction reaction is shown in FIG. 2. As seen, 2 mole equivalents of $Cr^{+6}$ is reduced by 3 mole equivalents of $Sn^{+2}$ to 2 mole equivalents of $Cr^{+6}$ and 3 mole equivalents of $Sn^{+2}$. Thus, a stoichiometric excess means that more than 3 mole equivalents of $Sn^{+2}$ are added for each 2 mole equivalents of $Cr^{+6}$. A preferred amount is a 1.1–10 fold stoichiometric excess. Thus, if the water contains 50 ppb $Cr^{+6}$, an amount of stannous salt that produces a final stannous concentration of between about 150–750 ppb is added to the water.

Figure 3A:
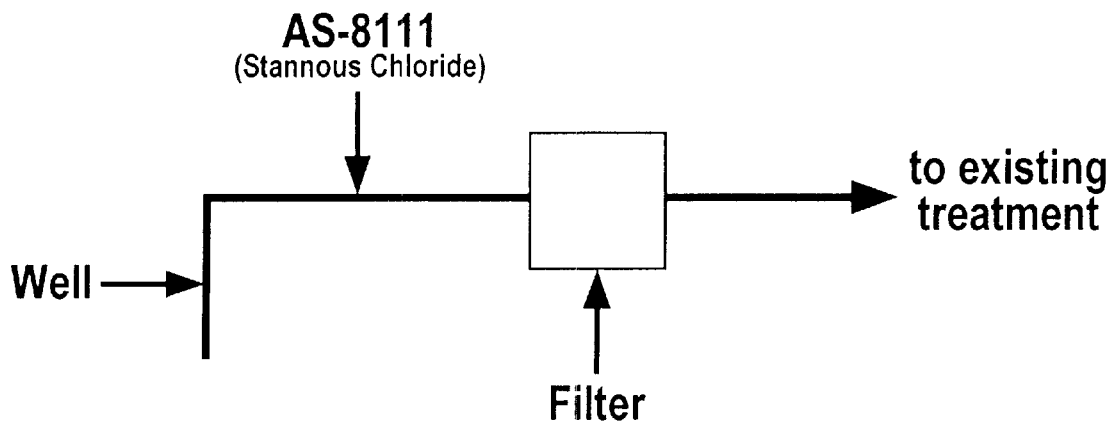
FIGS. 3A–3B show a schematic for treatment of drinking water (FIG. 3A) and wastewater (FIG. 3B) with an embodiment of the present invention.
Figure 3B:
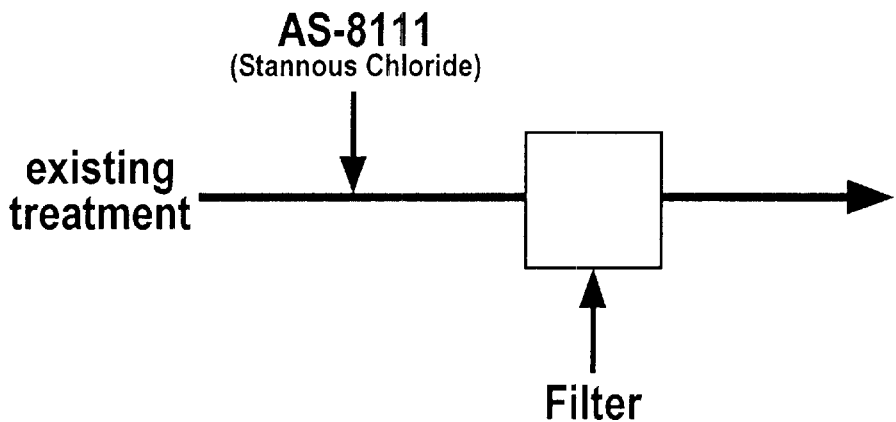

A preferred embodiment of the treatment method of the invention is illustrated schematically in FIGS. 3A–3B. In FIG. 3A, a method for treating drinking water is illustrated. Here, water is obtained at the well, and prior to treatment by an existing treatment protocol, an amount of a stannous salt of an inorganic acid, such as stannous chloride, is added. The amount of stannous salt added is sufficient to substantially reduce the amount of oxidized chromium ion present in the drinking water. For example, the stannous chloride is added in stoichiometric excess of the oxidized chromium ion. A filtration step is shown, but is merely optional.

FIG. 3B illustrates the steps of a preferred embodiment for treatment of wastewater. Here, after water has undergone treatment by an existing treatment protocol, a stannous salt is added as discussed above. After reduction of the ion to a lower oxidation step, the water can be filtered by any suitable means, if desired.

In general, the rate of the reaction is about 1 minute when the stannous chloride is added in a 1.5 fold stochiometric excess.

The potential for reconversion in the presence of an oxidant such as sodium hypochloride or chlorine dioxide is about 50%.

The following examples further illustrate the invention described herein and are in no way intended to limit the scope of the invention.

IV. EXAMPLES

Example 1

Total chrome and hexavalent chromium ($Cr^{+6}$) were measured in ppm prior to and after treatment with a stannous chloride salt in stoichiometric excess of the $Cr^{+6}$ in the water. "Treated" refers to the amount of stannous chloride added to convert the color from a strong yellow to a light green, indicative of reduced chrome. The results are presented in Table 5.

TABLE 5

| Sample | Total Chrome in ppm | Chrome$^{+6}$ in ppm |
|---|---|---|
| Untreated | 175 | 113 |
| Treated | 205 | 6.94 |

While the invention has been described with reference to specific methods and embodiments, it will be appreciated that various modifications may be made without departing from the invention.

It is claimed:

1. In a water treatment method that includes the steps of obtaining water at a wellhead, transporting the water to a water-treatment plant, and treating the water at the plant with an oxidant, a method for removing or substantially reducing the amount of oxidized chromium ion present in water supplied from the plant as drinking water, comprising:

adding to water, prior to exposing the water to said oxidant, an amount of a stannous salt of an inorganic acid effective to reduce a substantial portion of any $Cr^{+6}$ present to a lower oxidation state.

2. The method of claim 1, wherein said adding includes (i) determining the level of $Cr^{+6}$ in the water obtained from the wellhead, and (ii) adding an excess stoichiometric amount of $Sn^{+2}$ to the water, where the stoichiometric amount is defined as $3Sn^{+2}$ to $2Cr^{+6}$.

3. The method of claim 2, wherein said excess stoichiometric added is about a 1.1–10 fold excess amount of $Sn^{+2}$.

4. The method of claim 1, wherein the stannous salt is added in an amount of between about 50–200 parts $Sn^{+2}$ per billion on a weight basis.

5. The method of claim 1, wherein the stannous salt is $SnCl_2$.

6. The method of claim 5, wherein said stannous salt is added as an acidified composition consisting essentially of $SnCl_2$, water and HCl.

7. The method of claim 1, where said lower oxidation state of $Cr^{+6}$ is $Cr^{+3}$.

8. A method of treating wastewater by removing or substantially reducing the amount of oxidized chromium ion, comprising:

treating the water with an oxidant; and adding to water, after exposing the water to said oxidant, an amount of a stannous salt of an inorganic acid effective to reduce a substantial portion of any $Cr^{+6}$ present to a lower oxidation state.

9. The method of claim 8, wherein said adding includes (i) determining the level of $Cr^{+6}$ in the water, and (ii) adding an excess stoichiometric amount of $Sn^{+2}$ to the water, where the stoichiometric amount is defined as $3Sn^{+2}$ to $2Cr^{+6}$.

10. The method of claim 9, wherein said excess stoichiometric amount is a 1.1–10 fold excess amount of $Sn^{+2}$.

11. The method of claim 8, wherein said stannous salt is added in an amount of between about 50–200 parts $Sn^{+2}$ per billion on a weight basis.

12. The method of claim 8, wherein said stannous salt is $SnCl_2$.

13. The method of claim 8, wherein said stannous salt is added as an acidified composition consisting essentially of $SnCl_2$, water and HCl.

14. The method of claim 8, which includes filtrating the water after addition of said stannous salt.

15. The method of claim 8, where said lower oxidation state of $Cr^{+6}$ is $Cr^{+3}$.

* * * * *